United States Patent
Delay

(10) Patent No.: US 9,694,721 B1
(45) Date of Patent: Jul. 4, 2017

(54) VEHICLE CAR SAFETY SEAT ALERT SYSTEM

(71) Applicant: John Delay, Hernando, FL (US)

(72) Inventor: John Delay, Hernando, FL (US)

(*) Notice: Subject to any disclaimer, the term of this patent is extended or adjusted under 35 U.S.C. 154(b) by 0 days.

(21) Appl. No.: 15/251,738

(22) Filed: Aug. 30, 2016

(51) Int. Cl.
*B60Q 1/00* (2006.01)
*B60N 2/26* (2006.01)
*B60Q 9/00* (2006.01)

(52) U.S. Cl.
CPC ............ *B60N 2/26* (2013.01); *B60Q 9/00* (2013.01)

(58) Field of Classification Search
None
See application file for complete search history.

(56) References Cited

U.S. PATENT DOCUMENTS

| | | | |
|---|---|---|---|
| 6,844,816 B1 * | 1/2005 | Melton | G07C 9/00111 340/5.27 |
| 7,348,889 B2 | 3/2008 | Monzo et al. | |
| 7,466,217 B1 | 12/2008 | Johnson et al. | |
| 7,714,737 B1 | 5/2010 | Morningstar | |
| 9,041,523 B1 | 5/2015 | Birdis et al. | |
| 9,139,128 B1 * | 9/2015 | Lemons | B60Q 1/00 |
| 2005/0200465 A1 | 9/2005 | Fabors et al. | |
| 2006/0103516 A1 | 5/2006 | Zang | |
| 2008/0055064 A1 | 3/2008 | Keith et al. | |
| 2009/0079557 A1 | 3/2009 | Miner | |
| 2010/0090836 A1 | 4/2010 | Trummer | |
| 2013/0033373 A1 | 2/2013 | Thomas | |

\* cited by examiner

*Primary Examiner* — Julie Lieu
(74) *Attorney, Agent, or Firm* — The Keys Law Firm PLLC

(57) ABSTRACT

A vehicle child safety seat alert system for alerting a caregiver if a child has been left behind in a vehicle. The vehicle child safety seat alert system includes a seat component configured to determine whether a child is sitting on the seat component, identify a Bluetooth signal from the target vehicle and use that signal to determine when the vehicle is turned off, and duplicate an RF signal that actuates the vehicle's sensory alarm system so as to be able to selectively actuate the vehicle's sensory alarm system. In use, with the seat component placed under a child's seat, whenever the vehicle has been turned off, if a child is still on top of the seat component, the seat component will wirelessly actuate the vehicle sensory alarm system after a predetermined period of time.

10 Claims, 2 Drawing Sheets

VEHICLE CAR SAFETY SEAT ALERT SYSTEM

BACKGROUND OF THE INVENTION

Field of the Invention

This invention relates generally to an alerting system and, more particularly, to a vehicle child safety seat alert system that is integrated with the alarm and power system of a vehicle.

Description of the Prior Art

The need for alerting devices to help a caregiver remember to retrieve a child from a vehicle safety seat when exiting the vehicle is well established. While attempts to address this need have been made, a problem which still exists is that any existing systems are commonly unable to receive real time inputs relating to several vehicle and operators conditions in order to provide an alert when necessary without repeatedly generating false alarms. Thus, there remains a vehicle child safety seat alert system that combines three sensor systems to provide a dependable alerting mechanism that does not generate false positives. It would be helpful if such a vehicle child safety seat alert system requires the use of a single additional component positioned in vehicle safety seat. It would be additionally desirable for such a vehicle child safety seat alert system to able to be readily coupled with a vehicle's existing keyless entry and alerting systems.

The Applicant's invention described herein provides for a vehicle child safety seat alert system adapted to provide a sensory alert if a child is present in a vehicle once the vehicle has been off for a predetermined time period. The primary components in Applicant's vehicle child safety seat alert system are a weight sensor, a networking interface, a controller and an antenna. When in operation, the vehicle child safety seat alert system enables more effective and reliable notification of a child endangered in a vehicle while eliminating the issue of false positives. As a result, many of the limitations imposed by prior art structures are removed.

SUMMARY OF THE INVENTION

A vehicle child safety seat alert system for alerting a caregiver if a child has been left behind in a vehicle. The vehicle child safety seat alert system comprises a seat component that includes a weight sensor, a networking interface, a controller, an antenna, a power source, a networking actuator, and a duplicator actuator, with the seat component configured to interact with a networking interface and sensory alarm system of a target vehicle. In this regard, the controller of the seat component is configured to determine whether a child is sitting on the seat component, identify a Bluetooth signal from the target vehicle and use that signal to determine when the vehicle is turned off, and duplicate an RF signal that actuates the vehicle's sensory alarm system so as to be able to selectively actuate the vehicle's sensory alarm system. In use, with the seat component placed under a child's seat, whenever the vehicle has been turned off, if a child is still on top of the seat component, the seat component will wirelessly actuate the vehicle sensory alarm system after a predetermined period of time.

It is an object of this invention to provide a vehicle child safety seat alert system that combines three sensor systems to provide a dependable alerting mechanism that does not generate false positives.

It is another object of this invention to provide a vehicle child safety seat alert system that requires the use of a single additional component positioned in vehicle safety seat.

It is yet another object of this invention to provide a vehicle child safety seat alert system able to be readily coupled with a vehicle's existing keyless entry and alerting systems.

These and other objects will be apparent to one of skill in the art.

DETAILED DESCRIPTION OF THE INVENTION

Figure 1:
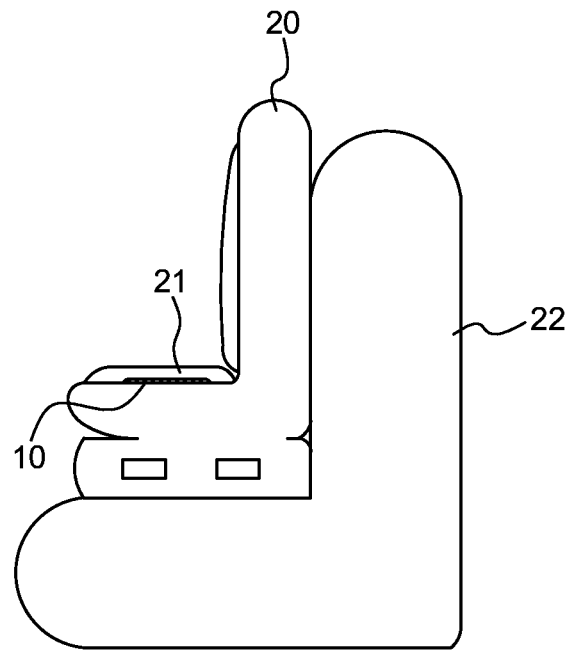
FIG. 1 is a side elevational view of a cross section of a seat component of a vehicle child safety seat alert system built in accordance with the present invention in place on a vehicle car seat.
Figure 2:
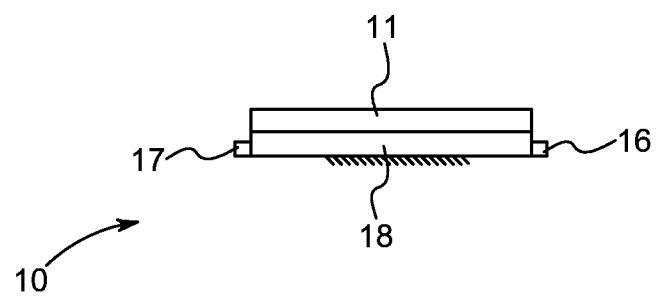
FIG. 2 is a side elevational view of a seat component of a vehicle child safety seat alert system built in accordance with the present invention.
Figure 3:
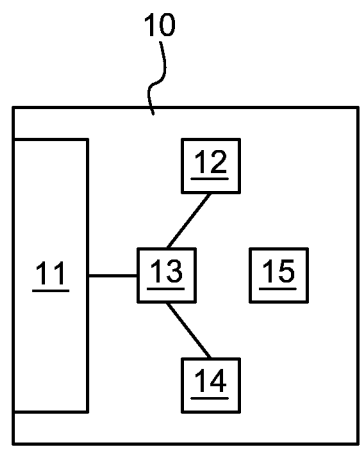
FIG. 3 is a block diagram showing the components of a vehicle child safety seat alert system built in accordance with the present invention.
Figure 3:
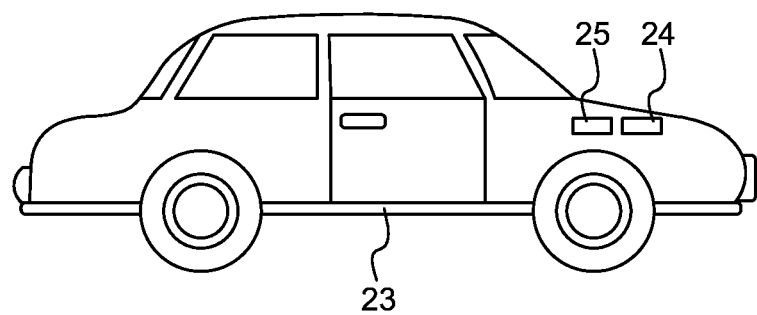

Referring now to the drawings and in particular FIGS. 1, 2, and 3, a vehicle child safety seat alert system is shown having seat component 10 that includes a weight sensor 11, a networking interface 12, a controller 13, an antenna 14, a power source 15, a networking actuator 16, and a duplicator actuator 17. The weight sensor 11 defines a load cell or other conventional weight sensing module that is operative to measure the weight of an object that is placed on top of it. In one embodiment, the networking interface 12 defines a Bluetooth interface, the antenna 14 defines a radio frequency ("RF") antenna, and the power source defines a battery. Each of the a weight sensor 11, a networking interface 12, a controller 13, an antenna 14, power source 15, networking actuator 16, and duplicator actuator 17 are electrically interconnected so as to allow the controller 13 communicate electrical signals with each of the weight sensor 11, networking interface 12, an antenna 14, networking actuator 16, and duplicator actuator 17 and allow the power source 15 to supply electricity to each of the weight sensor 11, networking interface 12, controller 13, and antenna 14.

In one embodiment, the controller 13 includes alert system software modules stored thereon which contain instructions that allows the controller 13 to perform routines that enable the receipt of a signal specifying a present weight from the weight sensor 11, identification and monitoring of the presence of a Bluetooth signal through the networking interface 12, and detection and duplication a RF signal operating a vehicle panic alert from a vehicle remote keyless system through the antenna 14.

Through its electrical connection to the weight sensor 11, as well as the alert system software modules, the controller 13 is configured to determine whether a child is sitting on the seat component 10 based on whether the present weight exceeds a predetermined threshold. In one embodiment, the predetermined threshold is five pounds. Through its electrical connection to the networking interface 12, as well as the alert system software modules, the controller 13 is configured to identify a Bluetooth signal from a target vehicle and determine when this target vehicle Bluetooth signal is turned off (and turned on) based on whether the signal is detected at a given moment. Through its electrical connection to the antenna 14, as well as the alert system software modules, the controller 13 is configured to detect an RF signal being sent from vehicle remote keyless system (or other remote actuating aspect of a vehicle alarm system), copy the RF signal, and selectively transmit the copied RF signal.

In use, it is contemplated that the seat component 10 is desirably positioned under the seat cushion 21 of a conventional vehicle child safety seat 20 that is positioned on a seat 22 in a vehicle 23. In order to enable the full operation of the vehicle child safety seat alert system, the vehicle 23 would have to include a vehicle sensory alarm 24 that includes an RF remote panic actuation and a Bluetooth interface 25 that allows Bluetooth enabled electronic devices to connect to the vehicle 23 when the vehicle 23 is on.

In one embodiment, the seat component 10 includes an adhesive layer 18 on its bottom surface so as to allow it to be fixed in place on a vehicle child safety seat 20 (desirably underneath the cushion 21).

To operate the vehicle child safety seat alert system, the seat component 10 must first be taught the identity of the vehicle's 23 Bluetooth interface 25. In one embodiment, this is done by holding the networking actuator 16 with the vehicle 23 (and Bluetooth interface 25 broadcasting and in range) until the networking interface 12 connects to the Bluetooth interface 25. Once the networking actuator 16 is released, the networking interface 12 disconnects from the Bluetooth interface 25 but saves the identity so that it can monitor the signal and determine by the signal's presence when the vehicle 23 is turned off.

In addition, the seat component 10 must copy the RF signal that actuates the vehicle sensory alarm 24. In one embodiment, this is done by holding the duplicator actuator 17 while causing the RF signal that actuates the vehicle sensory alarm 24 to be transmitted two times sequentially without releasing the actuator 17. Once the duplicator actuator 17 is released, the controller 13 saves the frequency of the RF signal that actuates the vehicle sensory alarm 24 and can then cause the antenna 14 to selectively transmit an RF signal at that exact frequency in order to actuate the vehicle sensory alarm 24.

In operation, with seat component 10 in place a vehicle child safety seat 20 under where a child would sit, anytime the networking actuator 16 senses that the vehicle has been turned off, it causes the controller 13 to determine if the present weight exceeds the predetermined threshold. If it does, the controller starts an exit timer of a predetermined length to allow time for everyone, including the child in the vehicle safety seat 20, to exit the vehicle 23. Once the exit timer expires, if the vehicle has not turned back on and the present weight still exceeds the predetermined threshold, the controller 13 transmits an RF signal at the copied frequency in order to actuate the vehicle sensory alarm 24.

In one embodiment, the exit timer is set for sixty (60) seconds.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A vehicle child safety seat alert system for a target vehicle, comprising:
   a seat component having a bottom surface, wherein said seat component includes a weight sensor, a networking interface, a controller, and an antenna which are each connected to a power source;
   wherein said controller is electrically connected to said weight sensor and configured to determine whether at least one object is positioned on top of the seat component through an output of said weight sensor;
   wherein said controller is electrically connected to said networking interface and configured to determine whether the target vehicle has been turned off through a reading from the networking interface;
   wherein said controller is electrically connected to said antenna and configured to duplicate an externally generated radio frequency signal that actuates a sensory alarm system integral with the target vehicle from a signal from the antenna; and
   wherein when said controller determines the target vehicle has been turned off and the at least one object is positioned on top of the seat component, said controller is configured to selectively transmit through the antenna a duplicated radio frequency signal so as to actuate the sensory alarm system.

2. The vehicle child safety seat alert system of claim 1, wherein said bottom surface includes an adhesive layer.

3. The vehicle child safety seat alert system of claim 1, wherein said networking interface defines a Bluetooth interface.

4. The vehicle child safety seat alert system of claim 1, wherein said antenna defines a radio frequency antenna.

5. The vehicle child safety seat alert system of claim 1, wherein said power source defines a battery.

6. The vehicle child safety seat alert system of claim 1, wherein the controller is configured to determine whether the target vehicle has been turned off by determining if a target vehicle networking interface signal is present.

7. The vehicle child safety seat alert system of claim 1, additionally comprising a networking actuator integral with said controller and operative to enable the controller to identify a target vehicle networking interface signal.

8. The vehicle child safety seat alert system of claim 7, wherein the controller is configured to determine whether the target vehicle has been turned off by determining if the target vehicle networking interface signal is present.

9. The vehicle child safety seat alert system of claim 1, additionally comprising a duplicator actuator integral with said controller and operative to enable the controller to duplicate a radio frequency signal from a discrete, external device that actuates a sensory alarm system integral with the target vehicle.

10. The vehicle child safety seat alert system of claim 1, wherein when said controller determines the target vehicle has been turned off for a predetermined time period and the at least one object is positioned on top of the seat component, said controller is configured to selectively transmit through the antenna the duplicated radio frequency signal so as to actuate the sensory alarm system.

* * * * *